(12) United States Patent
Landers et al.

(10) Patent No.: US 11,071,910 B1
(45) Date of Patent: *Jul. 27, 2021

(54) UTILIZING GAMING BEHAVIOR TO EVALUATE PLAYER TRAITS

(71) Applicant: Wells Fargo Bank, N.A., San Francisco, CA (US)

(72) Inventors: Edward J. Landers, Lafayette, CA (US); Byron G. Chun, Daly City, CA (US); Samuel B. Martin, San Francisco, CA (US); Michael H. Chang, Millbrae, CA (US); Abhijit Rao, Irvine, CA (US); Traci H. Nguyen, San Francisco, CA (US); Douglas S. Pelton, Richmond, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/515,582

(22) Filed: Jul. 18, 2019

Related U.S. Application Data

(63) Continuation of application No. 15/229,995, filed on Aug. 5, 2016, now Pat. No. 10,357,713.

(51) Int. Cl.
| | |
|---|---|
| *G07F 17/32* | (2006.01) |
| *A63F 13/40* | (2014.01) |
| *A63F 13/75* | (2014.01) |
| *G06Q 40/02* | (2012.01) |
| *A63F 13/335* | (2014.01) |

(52) U.S. Cl.
CPC ............ *A63F 13/40* (2014.09); *A63F 13/335* (2014.09); *A63F 13/75* (2014.09); *G06Q 40/025* (2013.01)

(58) Field of Classification Search
CPC .................................................. G06Q 40/025
See application file for complete search history.

(56) References Cited

U.S. PATENT DOCUMENTS

| | | | |
|---|---|---|---|
| 8,611,867 | B2 | 12/2013 | Swanburg et al. |
| 8,892,461 | B2 | 11/2014 | Lau et al. |
| 8,938,787 | B2 | 1/2015 | Turgeman |
| 9,619,965 | B1 | 4/2017 | Hill |
| 10,357,713 | B1 | 7/2019 | Landers et al. |

(Continued)

OTHER PUBLICATIONS

"U.S. Appl. No. 15/229,995, Non Final Office Action dated Aug. 9, 2018", 11 pgs.

(Continued)

*Primary Examiner* — Lawrence S Galka
(74) *Attorney, Agent, or Firm* — Schwegman Lundberg & Woessner, P.A.

(57) ABSTRACT

A system includes at least one hardware processor in communication with a user computing device associated with a user and a memory storing instructions. When executed by the at least one hardware processor, the instructions cause the at least one hardware processor to perform operations including receiving gaming behavior data associated with the user playing a computer game on the user computing device, the gaming behavior data includes one or more of session-based behavior data, game-selection behavior data, and ancillary gaming behavior data, determining a first trait of the user based on the gaming behavior data, and automatically computing a financial risk factor associated with the user based on the determined first trait.

18 Claims, 4 Drawing Sheets

(56) References Cited

U.S. PATENT DOCUMENTS

| | | |
|---|---|---|
| 2009/0181777 A1 | 7/2009 | Christiani et al. |
| 2009/0234711 A1 | 9/2009 | Ramer et al. |
| 2013/0296039 A1 | 11/2013 | Engineer et al. |
| 2014/0207518 A1 | 7/2014 | Kannan et al. |
| 2014/0244476 A1 | 8/2014 | Shvarts et al. |
| 2014/0295956 A1 | 10/2014 | Katz et al. |
| 2015/0141123 A1 | 5/2015 | Callaway |
| 2015/0174493 A1 | 6/2015 | Stauffer et al. |
| 2015/0243133 A1 | 8/2015 | Nicholas |
| 2017/0169656 A1 | 6/2017 | Froy, Jr. |

OTHER PUBLICATIONS

"U.S. Appl. No. 15/229,995, Non Final Office Action dated Dec. 29, 2017", 9 pgs.
"U.S. Appl. No. 15/229,995, Notice of Allowance dated Mar. 14, 2019", 8 pgs.
"U.S. Appl. No. 15/229,995, Response filed Feb. 8, 2019 to Non Final Office Action dated Aug. 9, 2018", 9 pgs.
"U.S. Appl. No. 15/229,995, Response filed Mar. 29, 2018 to Non Final Office Action dated Dec. 29, 2017", 10 pgs.
U.S. Appl. No. 15/229,995 U.S. Pat. No. 10,357,713, filed Aug. 5, 2016, Utilizing Gaming Behavior to Evaluate Player Traits.

US 11,071,910 B1

UTILIZING GAMING BEHAVIOR TO EVALUATE PLAYER TRAITS

CROSS-REFERENCE TO RELATED APPLICATION

This application is a continuation of U.S. patent application Ser. No. 15/229,995, filed Aug. 5, 2016, which is incorporated by reference herein in its entirety.

TECHNICAL FIELD

Embodiments described herein generally relate to computer gaming and, for example and without limitation, to systems and methods for utilizing gaming behavior to evaluate traits of a player.

BACKGROUND

In the course of daily life, many people play computer games for entertainment. Players may play computer games on a variety of computing devices, such as traditional desktop computers, laptop computers, or mobile devices (e.g., smartphones, tablet computers, wearable devices, and so forth). There are many different types of computer games made available to players (i.e., game genres). Some games may be word-based games, or board-style games (e.g., turn-based games). Some may be strategy games, or action games, or puzzle games. Some games may be single-person games, while other games may be played with or against another person, or with or against multiple other people.

Before playing a game, players make decisions with regard to what games they play. For example, many people favor certain types of games and, as such, tend to gravitate to similar games when they have time to spare for entertainment. During game play, players make decisions and take actions that impact the outcome of the game. These decisions may be based on experience with the game, but may also be influenced by other factors.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
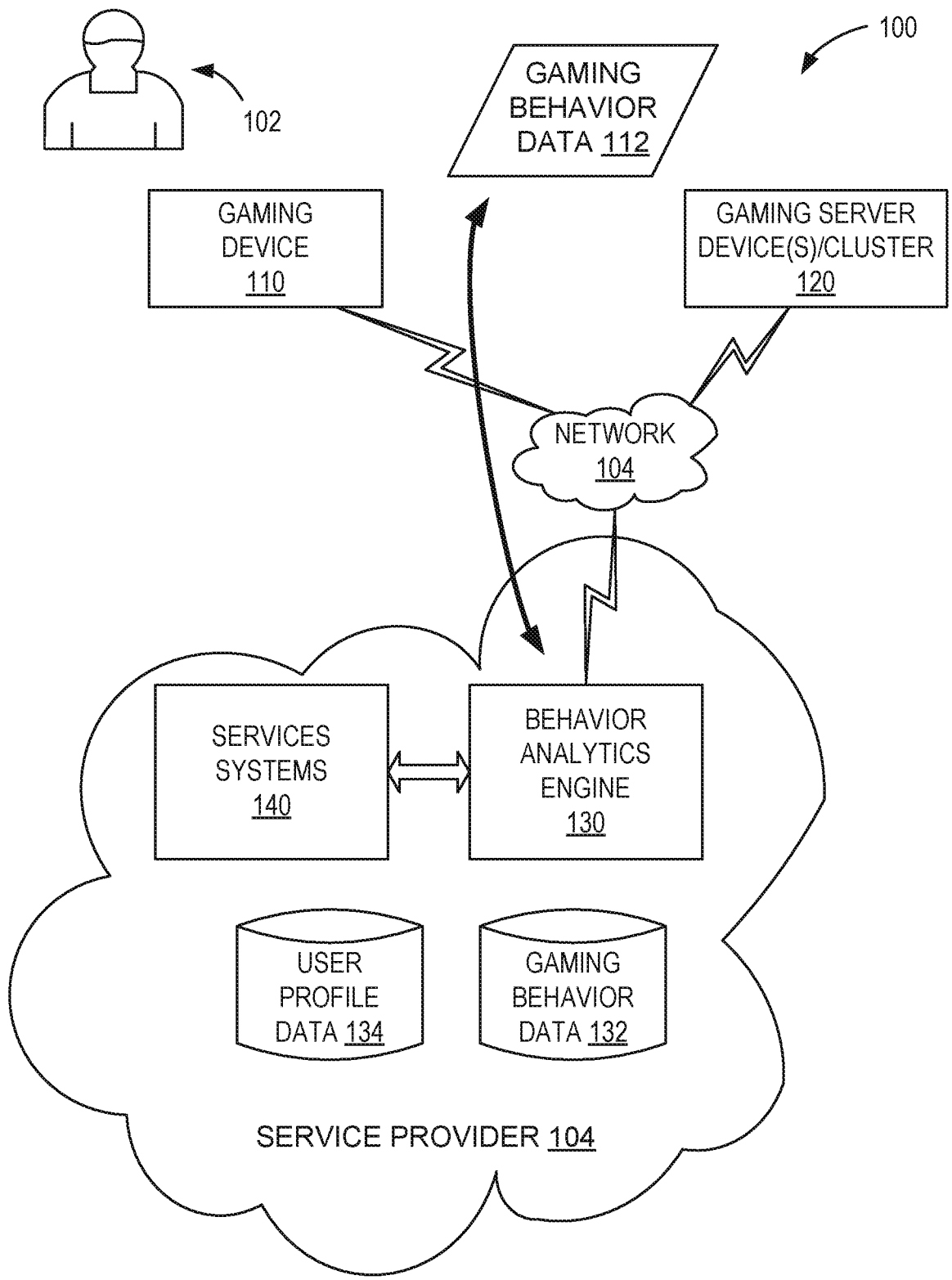
FIG. 1 illustrates an example networked environment including components of a gaming behavior analysis system for analyzing gaming behaviors of a user.

As computer gaming continues to gain popularity, more people are finding particular computer games or types of computer games that they enjoy playing. As players spend time with computer games, they encounter decisions (e.g., during game play) and provide input to the computer game that influence game play. A gaming behavior analysis system and method is described herein that analyzes gaming behavior of players relative to these games.

In some example embodiments described herein, a user ("player") selects a computer gaming application (or just "game") and plays the game during their normal day. The game may be provided to the player by computing devices such as a mobile device (e.g., as an app on the player's smartphone or tablet), a personal computer (PC) (e.g., as an application installed locally on the PC, or downloaded and executed as a web- or cloud-based application), a gaming console (e.g., Xbox, Playstation, Wii), and so forth (referred to herein as the "local gaming device," or just "gaming device"). Some computer games may also involve one or more other computing devices such as gaming servers (e.g., server devices enabling multi-person games, providing remote content, providing digital distribution services), or web services (e.g., server devices providing game content for web- or cloud-based games), gaming devices of other users (e.g., for multi-person games), and so forth.

In one example embodiment, the gaming behavior analysis system includes a behavior analytics engine. During operation, the behavior analytics engine receives gaming behavior data associated with the player. The gaming behavior data may include session-based behavior data (e.g., in-game decisions made by the player during particular gaming sessions, aspects of performance of the player within the game, and so forth), game-selection behavior data (e.g., which games the player selected to play, frequency or time played, device or forum in which the game was played, and so forth), or ancillary gaming behavior data (e.g., whether the player uses gaming cheats, accesses dark networks for anonymity, uses hacked versions of games for competitive advantage). The analytics engine analyzes the gaming behavior data to determine character traits of the player (e.g., tendencies, skills, propensities). The analytics engine may then use the determined traits of the player to make decisions regarding various financial services involving the player.

In the example embodiment, outside of the gaming environment, the player is also a consumer of one or more financial services offered by a service provider. For example, the player may apply for a mortgage with the service provider, or may be an investment client with an investment or retirement portfolio managed by the service provider, or may be the holder of a credit card provided by the service provider, or may be a loan applicant for a loan offered by the service provider (e.g., student loan, personal loan). Assessments of a person's character are important parts of many financial decisions made by providers of financial services. The analytics engine uses gaming behavior data of the player/consumer to influence decisions made regarding the consumer (e.g., which services to offer to the consumer, or how trustworthy the consumer is, or whether to approve a loan or extend a line of credit to the consumer). Gaming behavior data may provide insights into the character traits (e.g., personality traits) of the consumer that may not be available from conventional sources such as their credit history. In some embodiments, the financial services are offered by the service provider to the player inside the gaming environment (e.g., in real-time, or with time gap between trait observation and offering of services).

FIG. 1 illustrates an example networked environment including components of a gaming behavior analysis system 100 for analyzing gaming behaviors of a user 102. The user 102 may also be referred to herein as a player 102, or as a consumer 102, depending on the context in which the user 102 interacts with the gaming behavior analysis system 100 (e.g., as a player of a computer game, or as a consumer of financial products or services). In an example embodiment, the gaming behavior analysis system 100 includes one or more gaming devices 110 (e.g., gaming devices local to the user 102) coupled in communication with an analytics engine 130 via a network 104 (e.g., the Internet), and multiple databases including gaming behavior data 132 and user profile data 134. In some embodiments, the gaming behavior analysis system 100 may also include one or more gaming server devices 120 (e.g., single server, cluster of servers) that, for example, provide game content or services to the gaming device 110.

In the example embodiment, the gaming device 110 is a computing device with which the user 102 primarily engages with (e.g., purchases, executes, plays) a computer game (not separately shown in FIG. 1). In some embodiments, the gaming device 110 may be a personal computer of the user 102 (e.g., a desktop or laptop computer), or the gaming device 110 may be a mobile computing device of the use 102 (e.g., a tablet, a smartphone, a wearable computing device), or the gaming device 110 may be a console gaming device (e.g., Xbox, Playstation, Wii). The gaming device 110 may include one or more display devices (not separately shown, e.g., computer monitors, touch screen, virtual reality (VR) headset display) through which the user 102 views gaming content, as well as one or more input devices (e.g., keyboard, mouse, touchscreen, gamepads, microphone, motion sensor, camera, and so forth) through which the user 102 interacts with gaming content. The gaming device 110 may include additional hardware, and may be any computing device that enables the operation of the systems and methods described herein.

During operation, the user 102 plays the computer game on the gaming device 110. The gaming behavior analysis system 100 captures gaming behavior data 112 associated with game play of the user 102. The gaming behavior data 112 may be generated by the gaming device 110 or, in some embodiments, by the gaming server device 120. Gaming behavior data 112 may include game-selection behavior data, session-based behavior data, or ancillary gaming behavior data. In some embodiments, the user 102 may interact with other players inside the game, and the gaming behavior analysis system 100 may analyze these interactions.

Game-selection behavior data includes data associated with aspects of which game(s) the user 102 decides to play. Game-selection behavior data may include data identifying game(s) played by the user 102, the genre of games played by the user 102 (e.g., first-person shooter, role-playing game, real-time 3D adventure game, puzzle game, and so forth), how long the user 102 plays each particular game (e.g., total play time, individual session play times), how often the user 102 plays each particular game (e.g., game play frequency), on what type of device or which particular gaming device (e.g., the gaming device 110) the user 102 plays each particular game, or how the user 102 interacts with each particular game (e.g., via web page, social network, online service, local executable). Game-selection behavior data tends to be "game-agnostic," in that this behavior data is less dependent on the content of the game itself.

Session-based behavior data includes data associated with in-session game play of the user 102 playing the game. Session-based behavior data may include data regarding in-game decisions made by the player during game play (e.g., what decisions the player made during game play during gaming sessions, how the player approaches challenges, e.g., easiest first), aspects of performance of the player within the game (e.g., how well or poorly the decisions of the user 102 turned out), or aspects of social interaction (e.g., always seeking out partners, prefers solo play, seeking help from others to complete a task). Some session-based behavior data may be more game-dependent, in that analysis of the session-based behavior data may be context-dependent, requiring some knowledge of the game in order to evaluate the data.

Ancillary gaming behavior data includes other data associated with game play of the user 102. Ancillary gaming behavior data may include whether the player uses gaming cheats (e.g., entering cheat codes to gain a competitive advantage within the game, or over other players), accesses dark networks for anonymity (e.g., downloading games, gaming content, game executables, cheats or cheat codes from anonymity or peer-to-peer networks such as The Onion Router (TOR)), using hacked versions of games (e.g., executables or other modified versions of games used to gain competitive advantage, often used in multiplayer gaming environments), or game modding (e.g., legal game modification to make the game operate in a manner different from its original version).

During game play, the user 102 interacts with the game via the local computing device 110 (e.g., via the input devices), controlling aspects of game play as the game progresses. While the user 102 is playing the game, the gaming device 110 or the gaming server device 120 may capture session-based behavior data associated with the game play of the user 102. The gaming behavior data 112 is transmitted to the behavioral analytics engine 130 for behavioral analytics processing. More specifically, the behavioral analytics engine 130 determines one or more traits regarding the user 102 based on the gaming behavior data.

In the example embodiment, the behavior analytics engine 130 also interacts with one or more financial services systems 140 of a service provider 106 (e.g., a financial services company). The service provider 106 may offer financial services such as, for example, mortgage services, investment services, payment card services, or banking services to consumers such as the user 102. Assessments of a person's character may be considered when offering some services. For example, a trait of fiscal responsibility or trustworthiness in the user 102 may influence a level of riskiness of the user 102 for paying back a mortgage, or for extending a line of credit on a credit card or loan. If the user 102 is fiscally responsible, then the user 102 may represent a low risk for a home mortgage. For another example, a trait of risk-taking of the user 102 may influence what investment services or investment opportunities the service provider 106 may offer to the user 102. If the user 102 is a risk-taker, then the user 102 may be more interested in high-risk, high-reward investment opportunities, or if the user 102 is not a risk-taker, then the user 102 may be more inclined toward safer investment opportunities (e.g., municipal bonds). For another example, if the user 102 achieves a perfect score within the game, this may be indicative of cheating, and thus a trait of cheater, thereby lowering trustworthiness of the user 102. For another example, if the user 102 seeks out situational learning to perform new challenges or more rewarding tasks, then the user 102 may be more confident or less conservative, and thus may be more inclined toward riskier investment opportunities, or if the user 102 is more conservative (e.g., preferring to repeat the same challenges, even if rewards are diminished), then the user 102 may prefer more conservative investments.

During operation, the gaming behavior analysis system 100 determines one or more character traits of the user 102 based on the gaming behavior data 112 and uses those traits to influence one or more service offerings for the user 102. In some embodiments, the gaming behavior analysis system 100 may also use user profile data 134 associated with the user 102 to determine the character traits of the user 102, or as additional factors for the service offerings. The example gaming behavior analysis system 100 shown in FIG. 1 is one example architecture, but it should be understood that other architectures are possible. For example, the behavior analytics engine 130 may reside on the gaming device 110, or on the gaming server device 120, or the gaming device 110 may be the gaming server device 120, or any combination thereof.

Figure 2:
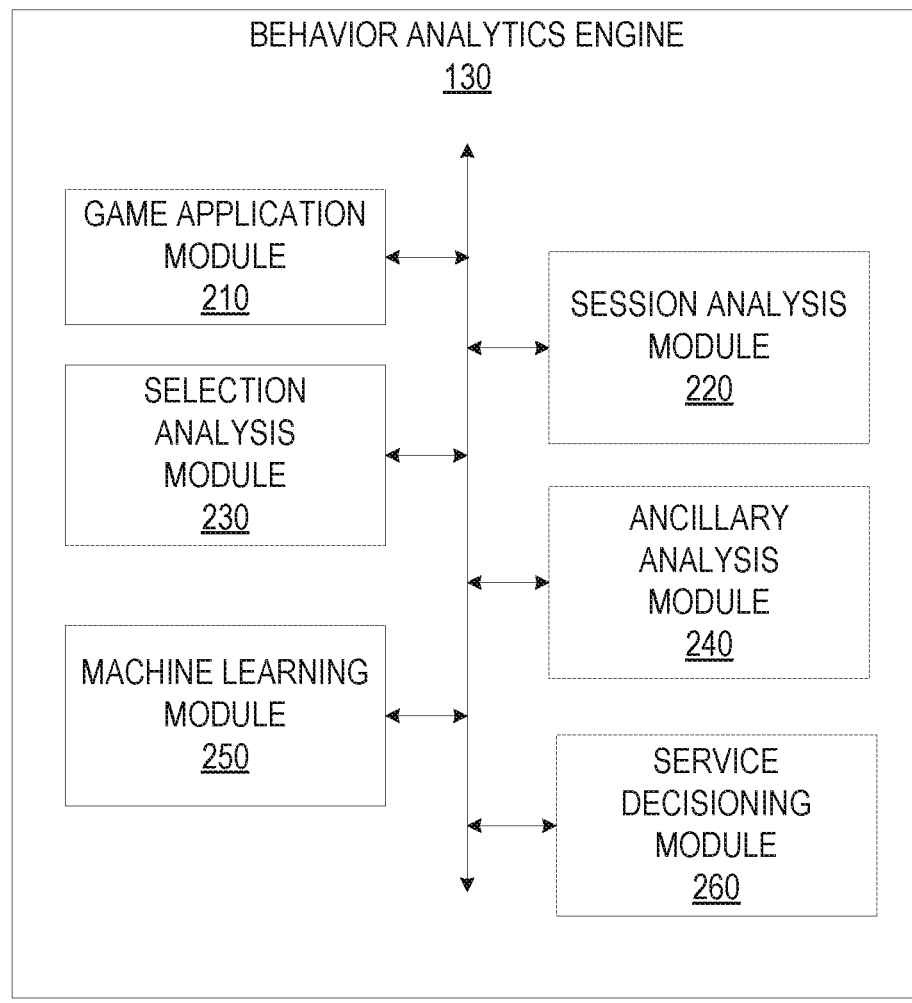
FIG. 2 is a block diagram showing components provided within the behavior analytics engine according to some embodiments.

FIG. 2 is a block diagram showing components provided within the behavior analytics engine 130 according to some embodiments. The behavior analytics engine 130 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases (e.g., gaming behavior data 132, user profile data 134) via database servers (not separately shown).

In an example embodiment, the behavior analytics engine 130 includes a game application module 210, a session analysis module 220, a selection analysis module 230, an ancillary analysis module 240, a machine learning module 250, and a service decisioning module 260. The actions of each of these modules is described in greater detail below.

In the example embodiment, the game application module 210 provides an application programming interface (API) configured to enable the behavior analytics engine 130 to communicate with the gaming device 110 and/or the server gaming device 120. In some embodiments, the game application module 210 enables a game application running on the gaming device 110 and/or the server gaming device 120 to transmit the gaming behavior data 112 to the behavior analytics engine 130. For example, a game developer may program the game application to transmit one or more aspects of gaming behavior data 112 to the behavior analytics engine 130 (e.g., session-based behavior data generated during game play). In some embodiments, the gaming device 110 may include a behavior analytics client (not separately shown) configured to monitor and transmit aspects of gaming behavior data 112 from the gaming device 110 to the behavior analytics engine 130. For example, the behavior analytics client may monitor game-selection behavior data, or ancillary gaming behavior data, or session-based behavior data, and transmit that data to the game application module 210. The behavior analytics engine 130 may, for example, receive gaming behavior data 112 in an XML format (e.g., "<cheats> yes </cheats>", or "<action_taken> <action> quest123 </action> <status> success </status> </action_taken>").

In the example embodiment, the session analysis module 220 processes session-based behavior data to evaluate one or more traits of the user 102. More specifically, the session analysis module 220 evaluates conduct of the user 102 within gaming sessions and makes a conclusion regarding a trait of the user 102. Some traits that may be determined based on session-based behavior data include passivity, economic propensity, goal-focused, frugality, language proficiency, teaming, risk propensity, learning propensity, character development, or maturity. Further, the session analysis module 220 may include various sub-modules configured to analyze session-based behavior data for a particular game. Some session-based behavior data is tied closely to game-specific actions and, as such, the session analysis module 220 is configured to interpret session-based behavior data for the specific game.

One trait that may be evaluated by the session analysis module 220 is regarding discretionary violence or passivity. For example, some computer games may include optional aspects of violent conduct within the game ("discretionary violence", e.g., conduct which is not necessary to complete objectives within the game, but that the user 102 may decide to perform anyway). The session analysis module 220 may receive session-based behavior data indicating that the user 102 has performed such discretionary violence and, as such, may evaluate the user 102 as not trustworthy, and thus a riskier prospect for various financial services. Extremely aggressive behavior may be an indicatory of a higher propensity for fraud and, as such, may trigger a flag for auditing, or suspicious activity reporting (SAR).

Another trait that may be evaluated by the session analysis module 220 is the economic propensity of the user (e.g., affinity or preference for trading via in-game economics). For example, some computer games may include aspects of financial trading (e.g., in-game marketplaces or financial planning aspects). The session analysis module 220 may receive session-based behavior data indicating that the user 102 is highly active (e.g., greater than the average player) in the trading aspect of the game and, as such, may evaluate the user 102 as being "trading-conscious," and thus a candidate for certain investment services (e.g., day-trading tools, brokerage advisors). The session analysis module 220 may receive session-based behavior data indicating that the user 102 is highly profitable (e.g., greater than the average player) in the trading aspect of the game. As such, the session analysis module 220 may evaluate the user 102 as being "trading-proficient," and thus a candidate for certain investment services. Someone that legitimately profits economically within the game (e.g., aggregating a relatively high amount of in-game currency in a short period of time) may be a strong candidate for premium financial products (e.g., brokerage or real estate loans). Conversely, someone that performs poorly, economically, may receive a lowered level of marketing of financial products. In some embodiments, the player may be offered anchored instructions within the game on how to perform with a real-world financial instrument. The player may then be allowed to assess their own performance, or receive feedback. The player may be presented with in-game opportunity to perform a similar action in the real world, with added incentives.

Another trait that may be evaluated by the session analysis module 220 is regarding whether the user 102 is goal-focused. For example, some computer games may include in-game goals or tasks that may be performed by the user 102 during game play. The session analysis module 220 may analyze session-based behavior data to determine whether the user 102 is goal-focused (e.g., actively pursues performing goals or tasks) or whether the user 102 is less concerned about set objectives (e.g., does what they want rather than pursue the in-game goals). In some embodiments, the session analysis module 220 may analyze session-based behavior data to determine whether the user 102 goes after the easy and quick rewards, or whether the user 102 plans ahead, builds, saves, and goes after larger goals that require more patience. As such, the session analysis module 220 may evaluate the user 102 as being "goal-focused," and thus a suitable prospect for investment or retirement services or home equity lines of credit (e.g., for home improvement projects) or 401k plans (e.g., willingness to shift between target retirement funds and individual funds).

Another trait that may be evaluated by the session analysis module 220 is regarding whether the user 102 exhibits frugality or fiscal responsibility, or whether the user 102 is more liberal or wasteful. For example, some computer games may include aspects in which the user 102 may collect and spend in-game money, points, or other currency during the course of play. The session analysis module 220 may analyze session-based behavior data to determine whether the user 102 is frugal (e.g., tends to save their in-game currency when presented with options to spend) or fiscally responsible (e.g., spends carefully on strategically important expenditures), or whether the user 102 is liberal or wasteful (e.g., spends currency quickly, maintains smaller balances, wastes currency on expenditures not important to the goals of the game, gambles and loses currency within the game). In first-person shooter (FPS) style games, the session analysis module 220 may analyze the ammunition expenditure patterns of the user 102 to evaluate frugality (e.g., the rate at which the user 102 fires bullets at a target, or the percentage of hits). For example, if the user 102 tends to take single shots or short, controlled bursts, then the user 102 may be evaluated as frugal, where if the user 102 regularly uses their weapon on full automatic and expends a lot of ammunition, then the user 102 may be evaluated as liberal or wasteful. In vehicle simulation games (e.g., driving games, in which the user 102 primarily drives cars or other land-based vehicles, flight simulators, in which the user 102 primarily flies planes or other air-based vehicles), if the user 102 pilots their vehicle aggressively (e.g., uses excessive speeds and crashes often), then the user 102 may be evaluated as liberal or wasteful, where if the user 102 takes a more measured approach (e.g., uses speed more strategically or carefully, crashes less, yet still performs well), then the user 102 may be evaluated as frugal fiscally responsible. In some games, the user 102 may continue to invest in a pursuit (e.g., equipment) with which they are not able to perform, or make adequate use of, or which they do not take the time to learn the necessary skills. For example, in some games, you may be able to budget how much to spend on equipment, clothing, transportation when preparing to accomplish a task. Someone who is liberal or wasteful may invest all in one type, which is less likely to achieve the task. Someone who gives gifts consistently to make new friends in the hope of helping a team achieve a task may be considered liberal or wasteful. A willingness to lend or borrow equipment is being fiscally responsible. As such, the session analysis module 220 may evaluate the user 102 as being "frugal" or "fiscally responsible", and thus a suitable prospect for investment or retirement services, loan services (e.g., payment card lines of credit, mortgage, or home equity lines of credit). If the user 102 is determined to be "liberal" or "wasteful," the user 102 may be a suitable prospect for investment advice from an advisor for their investment portfolio, or provide extended information about fees involved such that they are more aware, as they may be more likely to gloss over such details (e.g., during initial account setup).

Another trait that may be evaluated by the session analysis module 220 is language proficiency of the user 102. For example, some computer games may include in-game communications features (e.g., between players) or direct communication to the players within the game (e.g., text-based or audio-based communications). For another example, if the user 102 uses detailed or descriptive tutorials (e.g., with helpful graphics) to understand a task on hand, then the user 102 may be considered language-deficient, whereas someone who reads a descriptive paragraph of text and is willing to get started with the task may be an indicator of language proficiency. For another example, if the user 102 uses an in-game option for language translation (e.g., for in-game chat or other game text), then the user 102 may be considered language-deficient. The session analysis module 220 may analyze session-based behavior data to determine whether the user 102 is proficient in a particular language (e.g., English) or whether the user 102 struggles to understand the particular language. As such, the session analysis module 220 may evaluate the user 102 as being proficient or under-proficient. If the user 102 is under-proficient with the language, then the user 102 may present a greater credit risk and, as such, may be denied certain types of credit (e.g., mortgage, payment card, home equity), or the user 102 may be in need of direct advisor assistance when evaluating investment opportunities, or a representative that speaks their particular native language (e.g., over telephone, or via Chabot, or in-person).

Another trait that may be evaluated by the session analysis module 220 is the in-game propensity of the user 102 to team with others. Some games enable the user 102 to optionally team with one or more other players (e.g., during game play). The session analysis module 220 may evaluate session-based behavior data to determine a level of discretionary teaming for the user 102. If the user 102 tends to team with others, this may indicate an ability to be a team player, or to learn quickly based on their ability and, as such, may indicate that the user 102 is a good candidate for a business line of credit (e.g., as an entrepreneur).

Another trait that may be evaluated by the session analysis module 220 is the in-game propensity of the user 102 to take risks. For example, some computer games may include easier paths or more conventional decision points in which "risk-averse" or "cautious" players may take those easier paths, where other more "risk-seeking" or "reckless" players may take a more aggressive or challenging path. The session analysis module 220 may analyze session-based behavior data to determine whether the user 102 is risk-averse (e.g., as compared to other players), or whether the user 102 is risk-seeking. For example, someone that passes at an opportunity to advance based on a level of difficulty may indicate that they are risk-averse, where someone that attempts a task the first time given the choice may be seen as risk-seeking. In some embodiments, the session analysis module 220 may identify and evaluate between four and ten distinct risk actions for a particular game or game type to analyze risk propensity. The session analysis module 220 may use this risk propensity trait to evaluate investment opportunities for the user 102. For example, a risk-averse user 102 may be more inclined to invest in more predictable or safer stocks or bonds (e.g., municipal bonds), where the risk-seeking user 102 may be more inclined to invest in more speculative investments with potential higher returns (e.g., startup companies). Successful risk-takers may be good candidates for brokerage products, where successful risk-averse players may be good candidates for CDs, savings accounts, or retirement accounts. Someone who is cautious is likely to appreciate when provided detailed information about new products or services being offered to them. In some embodiments, if the user 102 shows a propensity for risk-taking in a real estate-oriented game (e.g., in Monopoly®, buying properties early in the game and successfully leveraging those properties throughout the game), the session analysis module 220 may identify the user for marketing of commercial real estate or business loans.

Another trait that may be evaluated by the session analysis module 220 is the in-game propensity of the user 102 to learn. The session analysis module 220 may evaluate session-based behavior data to determine a level of propensity for learning for the user 102. If the user 102 is open to learning, this may indicate a willingness to be coached or taught about products or services that may be difficult to understand but more rewarding for the user 102.

Another trait that may be evaluated by the session analysis module 220 is the in-game propensity of the user 102 for character development. Some games enable the user 102 to develop their in-game character (e.g., building skills, or acquiring equipment). The session analysis module 220 may evaluate session-based behavior data to determine a propensity for character development for the user 102. If the user 102 tends to focus on activities that build their in-game character, this may indicate an eagerness to go after new products or services.

Another trait that may be evaluated by the session analysis module 220 is the maturity of the user 102. In some embodiments, the session analysis module 220 may analyze session-based behavior data to determine whether the user 102 acts maturely or immaturely within the game. Aspects of maturity that may be evaluated include in-game chat (e.g., person-to-person communications), or level of sophistication to comprehend directions or accomplish goals, or propensity to quit the game or abandon an in-game task upon failure, or by analyzing chat messages. The session analysis module 220 may use maturity of the user 102 to evaluate risk for loan services (e.g., payment card lines of credit, mortgage, or home equity lines of credit). An immature player may not be a good candidate for student loans or other credit products (e.g., requiring long payoff schedules), or for exposure to new products or services (e.g., because they may end up blaming the financial institution or a support team for their inabilities or if they encounter any hardships using the new product), where a mature player may be a good target for a mortgage product or other credit products.

Another trait that may be evaluated by the session analysis module 220 is the vocabulary selection of the user 102. Some games may, for example, include in-game communication functionality (e.g., enabling text- or voice-based chat communications between players). In some embodiments, the session analysis module 220 may analyze session-based behavior data to determine whether the user 102 uses vulgar language within in-game communications (e.g., obscenities, profanities, racial slurs, gender slurs, inappropriate topical areas, and so forth). The session analysis module 220 may utilize a vulgar language list (e.g., vulgar words, phrases) to detect incidents of vulgar language use. In some embodiments, the session analysis module 220 may perform speech recognition (e.g., on audio in-game communications) to convert voice communications into text for detecting vulgar language use. In some embodiments, vulgar language use may be evaluated based on one or more pre-determined thresholds. In some embodiments, vulgar language use may be evaluated based on a percentage of sentences in which the user 102 uses vulgar language, or a total number of uses of vulgar language. In some embodiments, the session analysis module 220 may include multiple vulgar language lists, where each list represents words or phrases grouped based on a level of vulgarity (e.g., somewhat vulgar, moderately vulgar, highly vulgar), and usage of terms within particular lists may be weighted based on the list in which they occur. The session analysis module 220 may use vulgarity of the user 102 to evaluate risk for loan services (e.g., payment card lines of credit, mortgage, or home equity lines of credit). Extremely aggressive behavior may be an indicatory of a higher propensity for fraud and, as such, may trigger a flag for auditing, or suspicious activity reporting (SAR).

In the example embodiment, the selection analysis module 230 also processes game-selection behavior data to evaluate one or more traits of the user 102. More specifically, the session analysis module 220 evaluates conduct of the user 102 with regard to the games the user 102 elects to play. Some game selection aspects that may be analyzed by the selection analysis module 230 include game type selection (e.g., which games or game types the user 102 elects to play), selection frequency (e.g., how often the user 102 elects to play a particular game, or for how long), what type of device or which particular gaming device the user 102 plays each particular game (e.g., the gaming device 110 as smartphone, tablet, desktop, or console device), or how the user 102 interacts with each particular game (e.g., via web page, social network, online service, local executable).

One aspect of game selection that may be evaluated by the selection analysis module 230 is regarding the type of game played by the user 102, or features within a game that may be favored by the user 102. There are many different types of computer games. Some players may gravitate to particular types of games, and the selection analysis module 230 may evaluate the user 102 based on these tendencies. For example, there are "first-person shooter" type computer games (e.g., where the player views a virtual world in the first person perspective and often shoots a gun during the course of the game), or fantasy type games (e.g., with swords and sorcery, such as Warcraft), or puzzle games (e.g., mental games where the player solves puzzles), or card games (e.g., Solitaire, Bridge), or board games (e.g., turn-based games such as Scrabble®), or economic games (e.g., games with a substantial economic component, such as production, distribution, trading, consumption of goods). Such types of games may not be exclusively one or the other. For example, a first-person shooter type game may also be a fantasy type game. The selection analysis module 230 may evaluate the tendencies of the user 102 with regard to game type selection and determine that, for example, a tendency to play economic games may make the user 102 a good candidate for brokerage type accounts, or a tendency to play FPS games may have a higher degree of acceptance for volatility in the market, or may be conservative and use FPS games as an outlet for their normally-conservative approaches.

Further, as another aspect of game selection, each computer game may include various additional components within the game that may be evaluated by the selection analysis module 230. Some players may gravitate to particular components within the game, or games having particular components, and the selection analysis module 230 may evaluate the user 102 based on these tendencies. For example, some games may include a strategy component (e.g., where the player may consider various options and select how to proceed), or a trading component (e.g., where the player may participate in an in-game marketplace to generate in-game currency), or a resource generation component (e.g., where the player may perform tasks that generate resources to be used within the game), or a dexterity component (e.g., where the player uses their physical dexterity during game play, via keyboard/mouse or other input device). Similarly, these components may not be mutually exclusive of one another. For example, a game with a strategy component may also include a dexterity component.

Another aspect of game selection that may be evaluated by the selection analysis module 230 is regarding selection frequency. The selection analysis module 230 may analyze how often the user 102 plays a particular game or type of game, or for how long (e.g., total time, or average session time), or how regularly the user 102 engages with a particular game, type of game, or game component. If the user 102 only occasionally plays a particular game, type of game, or component of a game (e.g., less than a pre-determined threshold, or less than a pre-determined threshold percentage of play time), then any determination made based on that data may be less certain. If the user 102 dedicates a more significant portion of their play time to a particular game, type of game, or component of the game more than the predetermined threshold), then the selection analysis module 230 may draw a conclusion regarding a preference of the user 102. For example, if the user 102 spends more than 50% of their game playing time playing first-person shooter type games, then the selection analysis module 230 may take actions based on the trait decisions described above. In some embodiments, the selection frequency may be used as a weight to a confidence score for the trait decision (e.g., higher confidence if the user 102 has a higher engagement with the particular game, type, or component).

In the example embodiment, the ancillary analysis module 240 processes ancillary gaming behavior data to evaluate one or more traits of the user 102. More specifically, the ancillary analysis module 240 evaluates ancillary conduct of the user 102 associated with game play. Ancillary gaming behavior data may include whether the user 102 uses gaming cheats, accesses dark networks for anonymity (e.g., downloading games, gaming content, game executables, cheats or cheat codes from anonymity or peer-to-peer networks such as The Onion Router (TOR)), or using hacked versions of games (e.g., executables or other modified versions of games used to gain competitive advantage, often used in multiplayer gaming environments), or other network-based factors.

For many games, there are methods that may be employed to cheat or otherwise gain an unfair advantage within the game (e.g., over other players, or over some integral challenge of the game itself). For example, cheat codes or hacked versions ("cheat content") are available for many computer games. Further, players may access some cheat content over anonymity networks (e.g., "darknets"). The ancillary analysis module 240 may detect use of cheat content by the user 102. The ancillary analysis module 240 may evaluate player in-game performance (e.g., scores) to determine whether the player is cheating. For example, a perfect score, or a score above a pre-determined threshold, or above a pre-determined threshold relative to the player's typical range of scores, may be indicative of cheating. Such use of cheat content or other indicators of cheating may indicate an untrustworthy character and, as such, the ancillary analysis module 240 may, for example, limit access to certain financial services (e.g., payment cards, loans), or may modify a risk score associated with the user 102 (e.g., increased risk due to untrustworthiness), or may increase security settings associated with the user 102 (e.g., two-factor authentication, update browser, and so forth), or may suggest security products, or may combine with user profile data 134 for sales and marketing purposes, or may limit (e.g., restrict, eliminate) marketing to the user 102. Use of cheat content may cause the ancillary analysis module 240 to flag existing accounts for further vetting relative to fraudulent activity, or restrict certain products or services from the user 102.

In some embodiments, the ancillary analysis module 240 may analyze a connection speed of the user 102 (e.g., between the gaming device 110 and the network 104). Connection speed may be an indicator of financial stability. For example, purchasing greater bandwidth through an Internet service provider (BP) may indicate that the user 102 is more able to pay off a loan product. In some embodiments, the ancillary analysis module 240 may analyze whether the user 102 utilizes a virtual private network (VPN) to connect to the network 104, or to the gaming server device 120, or to the service provider 106. Connecting via a VPN may indicate that the user 102 may have something to hide (e.g., may use the device 102 for nefarious uses) and, as such, may be considered less trustworthy. In some embodiments, the ancillary analysis module 240 may analyze whether the user 102 utilizes private browsing (e.g., via a web browser setting on the gaming device 110). Many web browsers include a privacy feature that disables browsing history and/or cache features. Use of private browsing by the user 102 may indicate that the user 102 has something to hide and, as such, may be considered less trustworthy.

In some embodiments, the ancillary analysis module 240 may analyze how the user 102 authenticates (e.g., with biometrics, e.g., using "something you are," or with password, e.g., using "something you know"). One known risk with biometrics is that the user 102 may permanently lose their biometric credential (e.g., to a hacker) if the authentication system is compromised. Players that elect to authenticate biometrically may be determined to be more risk-tolerant (e.g., progressive), where players that elect to avoid biometric authentication may be determined to be more risk-averse. A risk-tolerant player may be suitable to adopt new banking products, whereas a risk-averse player may be less suitable for more progressive banking products.

In some embodiments, the ancillary analysis module 240 may whether the user 102 practices game modding. If the user 102 mods games, they are likely more willing to understand details, and may be more responsible. These players may be more likely to be part of a tight-knit group, and they may be good ambassadors of new products or services.

In some embodiments, the traits determined for the user 102 may be grouped or otherwise categorized under a five factor model (FFM) that includes openness to experience, conscientiousness, extraversion, agreeableness, and neuroticism.

In the example embodiment, the machine learning module 250 may train a machine learning model that may be used to analyze the user 102. The model may be trained to categorize players based on any of the above-mentioned traits or actions. Training data may be harvested from players who play the game, and may be labeled based upon known financial data of those players. In some embodiments, the training data may be labeled based on an aggregate score of security behavior data and amount of fraudulent activity. Once trained, the model may be used to analyze traits based on the gaming behavior of the user 102.

In the example embodiment, the service decisioning module 260 uses the trait determinations made by the session analysis module 220, the selection analysis module 230, and the ancillary analysis module 240 to make service decisions or recommendations regarding the user 102. More specifically, the service decisioning module 260 executes any of the financial services outcomes described above. For example, the service decisioning module 260 may compute a risk score based at least in part on any of the traits described above, or may transmit a message to an advisor of the user 102 based on the trait determinations, or may automatically approve or deny the user 102 for financial services (e.g., loan approvals, extensions of lines of credit), or may automatically contact the user 102 regarding particular financial services or opportunities (e.g., investment advice). In some embodiments, the service decisioning module 260 may display the risk score of the user 102 and/or customer product suggestions based on the risk score to a customer service representative (e.g., a banker, a financial advisor) in a graphical user interface. The score may be on a scale between 1 and 25 (e.g., higher being more trustworthy). The representative may then use this score to provide product suggestions.

For example, presume that the behavior analytics engine 130 analyzes the user 102 on a number of traits "trait_factor_X," where X is an integer representing a particular factor. Each of the traits may be, for example, any of the gaming behaviors described herein. The behavior analytics engine 130 may compute an individual trait score for the user 102 relative to each "trait_factor_X." More specifically, a particular game may include a set of predefined actions. Each action may define a set of one or more traits which the action influences, and an influence value for that factor. Some actions may influence a single trait. Other actions may influence multiple traits. For example, presume a game action "Action 2" is defined with three influencing factors and associated influence values:

| | |
|---|---|
| Trait_factor_1 | 0.1 |
| Trait_factor_3 | 0.55 |
| Trait_factor_8 | 0.3 |

As such, Action 2 influences three of the traits, and relative to the influence value for each particular trait. Further, many such game actions may be predefined, each with their own set of influenced traits and associated influence values.

Continuing the example, in some embodiments, all the actions by the user 102 during gameplay may be used to generate data for the user 102 (e.g., as a profile baseline, or as an observation to be compared to the profile baseline). The user 102 may start out with each "trait_factor_X" set to zero and, over the course of one or more sessions of gameplay, the actions taken by the user 102 alter the trait factors for the user 102. The action results may be combined using, for example, mean, mode, median, or other indicators such as moving average convergence/divergence (MACD) or other methods that take into consideration the momentum (e.g., over a specific period of time) and the trend in change in behavior, or lack thereof. As such, the behavior analytics engine 130 computes a trait value of the user 102 for each trait.

To be eligible or ineligible for a particular product or service, the behavior analytics engine 130 may include a predefined set of thresholds relative to one or more of the trait factors. For example, for the user 102 to be eligible for a target product "Product X," the user 102 may have to have a trait_factor_a between 0.1 and 0.4, a trait_factor_b greater than 0.7, and a trait_factor_f between 0.2 and 0.5. These thresholds represent an eligibility criteria for the example target product. If the user 102 has scores that meet the thresholds for the target product, then the user 102 is considered eligible for the product or service. In some embodiments, a particular target product or service may define multiple sets of eligibility criteria.

Figure 3:
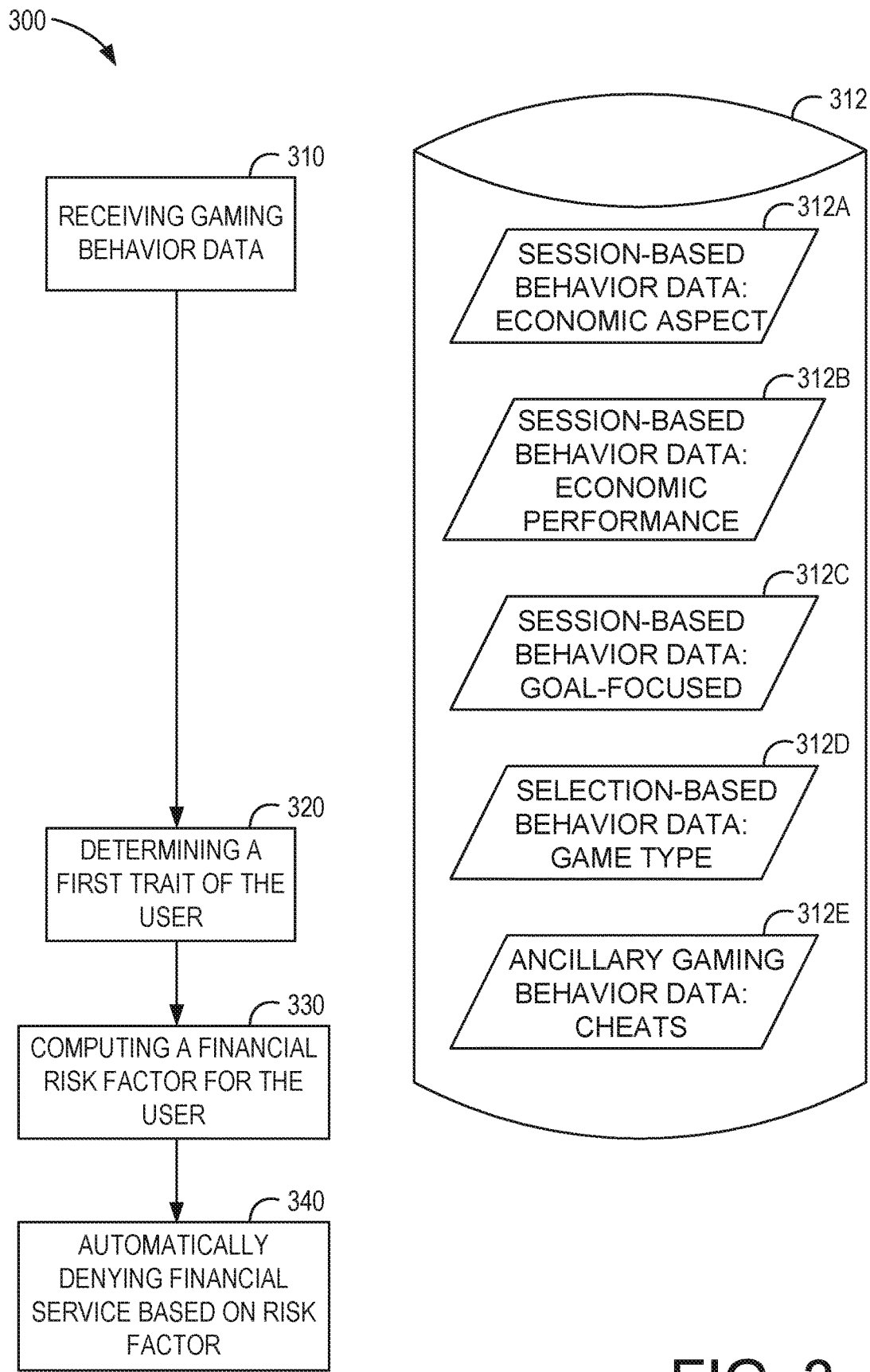
FIG. 3 illustrates an example computer-implemented method for determining traits of the user based on gaming behavior data.

FIG. 3 illustrates an example computer-implemented method 300 for determining traits of the user 102 based on gaming behavior data. The computer-implemented method 300, hereafter referred to as "the method 300," is performed by a computing device comprising at least one hardware processor and a memory. In an example embodiment, the method 300 includes receiving gaming behavior data 312 associated with a user 102 playing a computer game on a secondary computing device (see operation 310). The gaming behavior data 312 includes one or more of session-based behavior data, game-selection behavior data, and ancillary gaming behavior data. The method 300 also includes determining a first trait of the user based on the gaming behavior data (see operation 320). The method 300 further includes automatically computing a financial risk factor associated with the user based on the determined first trait (see operation 330).

In some embodiments, the gaming behavior data 312 includes session-based behavior data associated with an economic aspect of the computer game 312A, wherein determining the first trait includes determining that the user has an affinity for economics based on a level of participation in the economic aspect of the computer game. In some embodiments, the gaming behavior data includes session-based behavior data associated with an economic performance aspect of the play of the user within the computer game 312B, wherein determining the first trait includes determining that the user is fiscally responsible based on the economic performance aspect. In some embodiments, the gaming behavior data includes session-based behavior data associated with pursuing goals of the computer game 312C, wherein determining the first trait includes determining that the user is goal-focused based on a level of pursuit of the goals of the computer game by the user.

In some embodiments, the gaming behavior data includes game-selection behavior data associated with a type of computer game played by the user 312D, wherein determining the first trait includes determining that the user prefers a first type of computer game based on a frequency of play of the first type of computer game by the user. In some embodiments, the gaming behavior data includes ancillary gaming behavior data associated with cheating 312E, wherein determining the first trait includes determining that the user cheats during play of the computer game based on one or more of use of a cheat code and use of an illegally modified version of the computer game. In some embodiments, the method 300 also includes automatically denying access to one or more of a line of credit and a loan to the user based at least in part on the financial risk factor (see operation 340).

Figure 4:
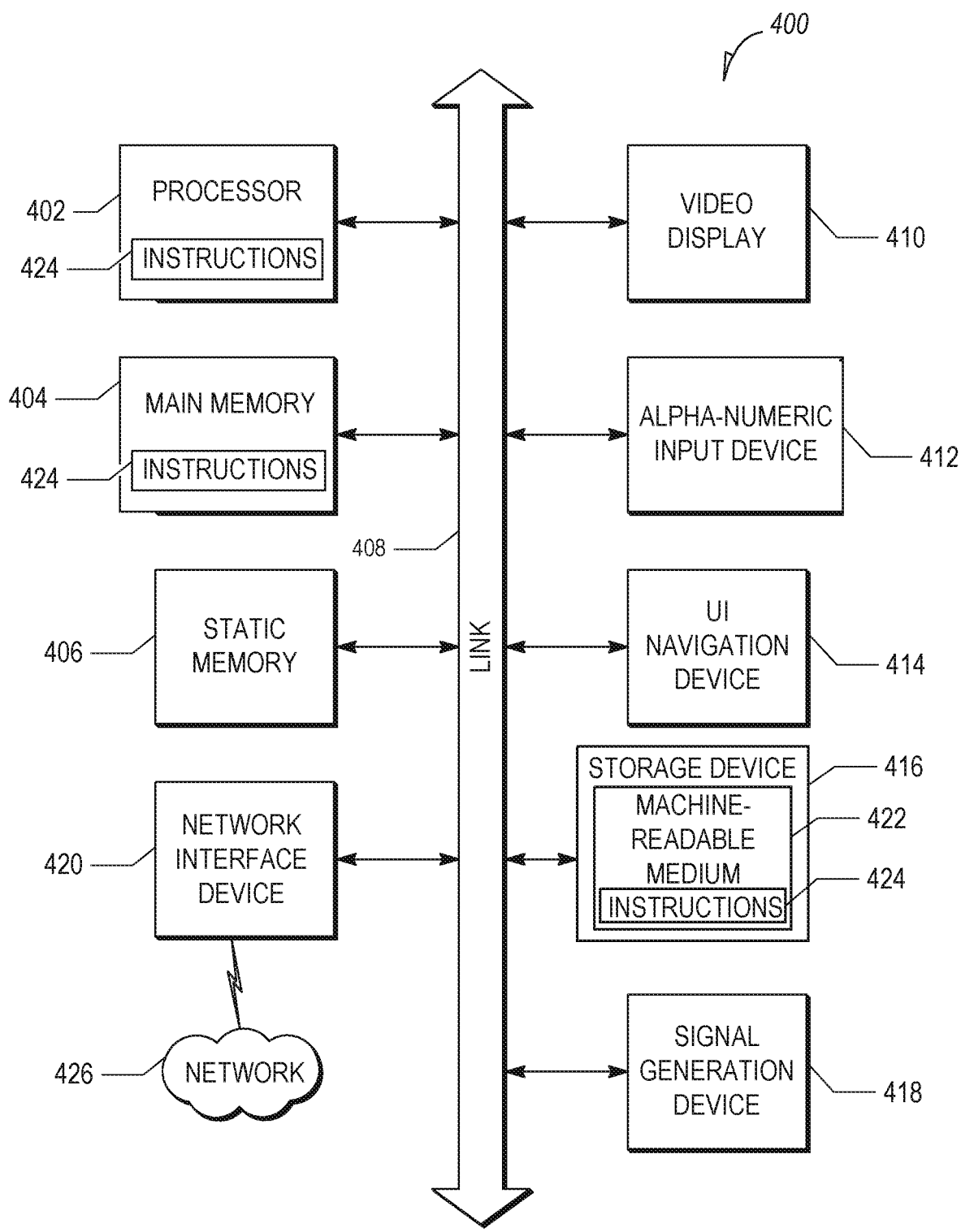
FIG. 4 is a block diagram of a machine in the example form of a computer system within which a set of instructions may be executed, for causing the machine to perform any one or more of the methodologies discussed herein.

FIG. 4 is a block diagram illustrating a machine in the example form of a computer system 400, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 can further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 can additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 can also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" can include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions (e.g., instructions 424) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system comprising:
    at least one hardware processor in communication with a user computing device associated with a user; and
    a memory storing instructions that, when executed by the at least one hardware processor, cause the at least one hardware processor to perform operations comprising:
        receiving gaming behavior data associated with the user playing a computer game on the user computing device, the gaming behavior data including session-based behavior, the session-based behavior including:
            data associated with pursuing goals of the computer game; and
            path taking data;
        determining a first trait of the user based on determining that the user is goal-focused based on a level of pursuit of the goals of the computer game by the user;
        automatically computing a financial risk factor associated with the user based on the first trait;
        determining a second trait of the user based on the gaming behavior data by determining a risk adverse trait based on a comparison of the path taking data with other user's path taking data for the computer game; and
        automatically computing a second financial risk factor associated with the user based on the second trait.

2. The system of claim 1, wherein the instructions, when executed by the at least one hardware processor, further cause the at least one hardware processor to perform operations comprising:
    determining a third trait of the user based on the gaming behavior data; and
    automatically computing a third financial risk factor associated with the user based on the third trait.

3. The system of claim 2, wherein determining the third trait includes determining a level of discretionary teaming within the game based.

4. The system of claim 2, wherein determining the third trait includes determining a language proficiency of the user.

5. The system of claim 2, wherein determining the third trait includes determining how a user authenticates to the computer game.

6. The system of claim 1, wherein the instructions further cause the at least one hardware processor to perform operations comprising:
 decisioning providing access to a line of credit or a loan to the user based at least in part on the first and second financial risk factors.

7. A non-transitory computer-readable storage medium, the computer-readable storage medium including instructions that when executed by at least one processor, cause the at least one processor to perform operations of:
 receiving gaming behavior data associated with a user playing a computer game on a user computing device, the gaming behavior data including session-based behavior data, the session-based behavior including:
  associated with pursuing goals of the computer game; and
  path taking data;
 determining a first trait of the user based on determining that the user is goal-focused based on a level of pursuit of the goals of the computer game by the user;
 automatically computing a financial risk factor associated with the user based on the first trait;
 determining a second trait of the user based on the gaming behavior data by determining a risk adverse trait based on a comparison of the path taking data with other user's path taking data for the computer game; and
 automatically computing a second financial risk factor associated with the user based on the second trait.

8. The non-transitory computer-readable storage medium of claim 7, wherein the instructions, when executed by the at least one processor, further cause the at least one processor to perform operations comprising:
 determining a third trait of the user based on the gaming behavior data; and
 automatically computing a second financial risk factor associated with the user based on the third trait.

9. The non-transitory computer-readable storage medium of claim 8, wherein determining the third trait includes determining a level of discretionary teaming within the game based.

10. The non-transitory computer-readable storage medium of claim 8, wherein determining the third trait includes determining a language proficiency of the user.

11. The non-transitory computer-readable storage medium of claim 8, wherein determining the third trait includes determining how a user authenticates to the computer game.

12. The non-transitory computer-readable storage medium of claim 7, wherein the instructions, when executed by the at least one processor, further cause the at least one processor to perform operations comprising:
 decisioning providing access to a line of credit or a loan to the user based at least in part on the first and second financial risk factors.

13. A method comprising:
 receiving gaming behavior data associated with a user playing a computer game on a user computing device, the gaming behavior data including session-based behavior, the session-based behavior including:
  data associated with pursuing goals of the computer game; and
  path taking data;
 determining a first trait of the user based on determining that the user is goal-focused based on a level of pursuit of the goals of the computer game by the user;
 automatically computing a financial risk factor associated with the user based on the first trait;
 determining a second trait of the user based on the gaming behavior data by determining a risk adverse trait based on a comparison of the path taking data with other user's path taking data for the computer game; and
 automatically computing a second financial risk factor associated with the user based on the second trait.

14. The method of claim 13, further comprising:
 determining a third trait of the user based on the gaming behavior data; and
 automatically computing a second financial risk factor associated with the user based on the third trait.

15. The method of claim 14, wherein determining the third trait includes determining a level of discretionary teaming within the game based.

16. The method of claim 14, wherein determining the third trait includes determining a language proficiency of the user.

17. The method of claim 14, wherein determining the third trait includes determining how a user authenticates to the computer game.

18. The method of claim 13, further comprising:
 decisioning providing access to a line of credit or a loan to the user based at least in part on the first and second financial risk factors.

* * * * *